March 28, 1967  C. C. BEER  3,310,824
VEHICLE WASHER
Filed April 21, 1966  5 Sheets-Sheet 1

INVENTOR
CARL C. BEER
BY Seidel & Gonda
ATTORNEYS.

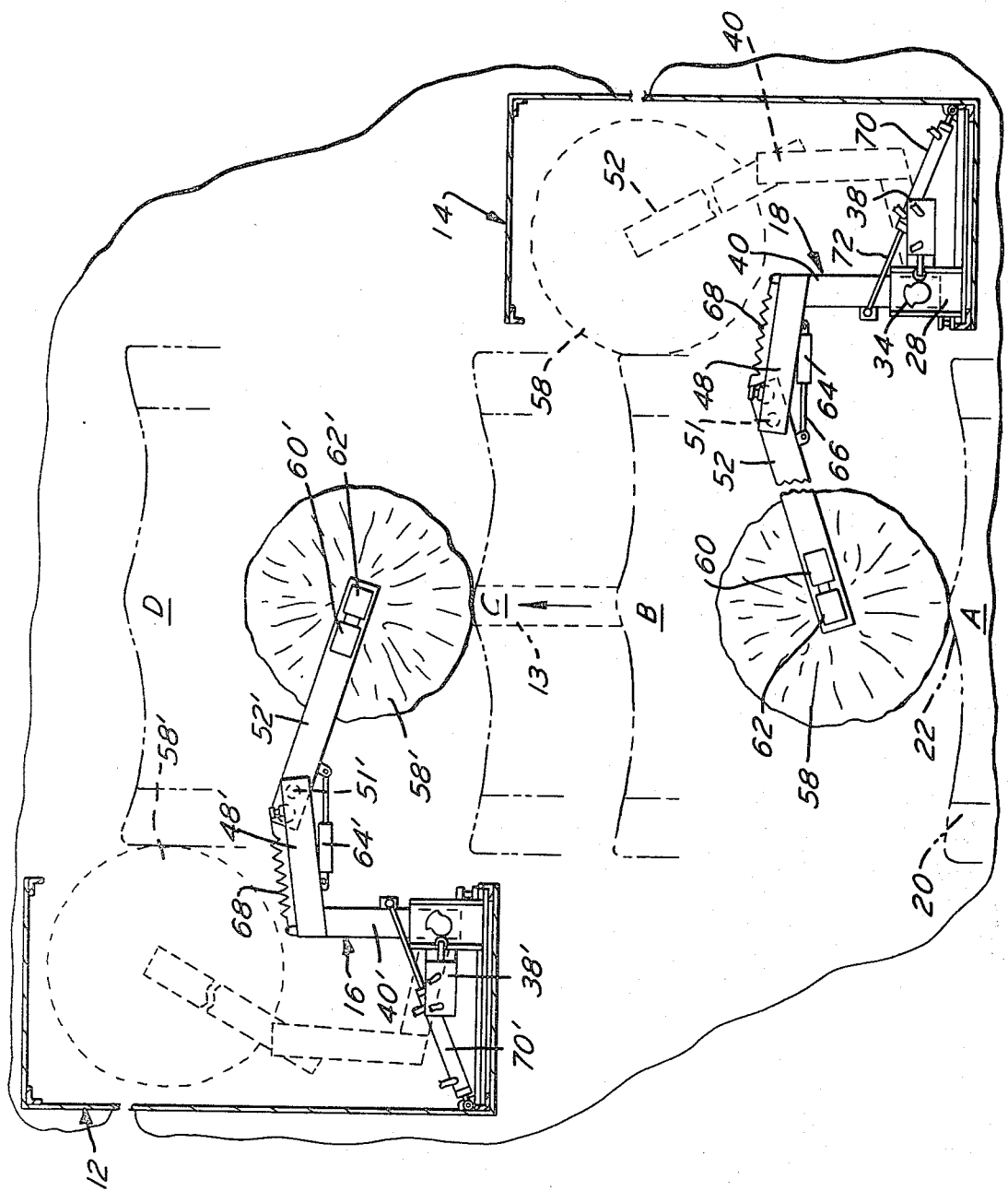

March 28, 1967                    C. C. BEER                    3,310,824
                              VEHICLE WASHER
Filed April 21, 1966                                    5 Sheets-Sheet 3

INVENTOR
CARL C. BEER
BY Seidel & Gonda

ATTORNEYS.

March 28, 1967   C. C. BEER   3,310,824
VEHICLE WASHER

Filed April 21, 1966   5 Sheets-Sheet 4

INVENTOR
CARL C. BEER
BY Seidel & Gonda
ATTORNEYS.

INVENTOR
CARL C. BEER
BY
ATTORNEYS.

United States Patent Office 3,310,824
Patented Mar. 28, 1967

3,310,824
VEHICLE WASHER
Carl C. Beer, Philadelphia, Pa., assignor to Sherman Car Wash Equipment Company, Palmyra, N.J., a corporation of New Jersey
Filed Apr. 21, 1966, Ser. No. 544,233
10 Claims. (Cl. 15—21)

This invention relates to a vehicle washer, and more particularly, to a washer at a stationary location past which vehicles will be moved and washed.

The vehicle washer of the present invention is preferably of the stationary type. By stationary is meant that the washing apparatus is positioned at a location and the cars move relative to the washing apparatus. However, the principles of the present invention may be utilized in other types of washing devices. Thus, the present invention is particularly adapted for use in conjunction with a vehicle washer of the type disclosed in Patents 3,241,167 and 3,237,229.

In accordance with the present invention, a vehicle engaging brush which may rotate about a vertical or a horizontal axis for contact with the side or the top of a vehicle is provided. The brush is supported by a unit having two sections which are pivotable with respect to each other. A biasing means is provided to bias the sections to a predetermined orientation. A blocking means is provided to pivot the sections with respect to each other to a predetermined orientation and thereby oppose the biasing means. Such pivoting action will be described in greater detail hereinafter and may be referred to as "knuckling in."

One of the features of the present invention is the ability of the brushes to engage the front and rear ends of the vehicle being washed. The general sequence of this action for brush is as follows: First, a portion of the front end of the vehicle is washed by one brush, then one side of the vehicle is washed by said brush, then said brush washes a comparable portion of the rear end of the vehicle. Thereafter, the brush is in an extended position so that it may immediately thereafter commence with washing of the front end of the next vehicle. The other brush follows this same sequence, but washes the remainder of the end portions as well as the opposite side of the vehicle.

It is an object of the present invention to provide a novel vehicle washer.

It is an object of the present invention to provide vehicle washing brush units which utilize a knuckling in principle so that a brush can wash part of a rear end of a vehicle in addition to a side and a part of a front end.

It is another object of the present invention to provide vehicle washing brushes capable of washing the front end, sides, and rear end of a vehicle, and be positioned after washing the rear end of a vehicle in a position so that they may commence with the washing of the front end of the next vehicle.

It is another object of the present invention to provide a vehicle washer which is simple, easy to construct, easy to maintain, and is reliable.

Other objects will appear hereinafter.

For the purpose of illustrating the invention, there is shown in the drawings a form which is presently preferred; it being understood, however, that this invention is not limited to the precise arrangements and instrumentalities shown.

FIGURE 2 is a sectional view taken along the line 2—2 in FIGURE 1.

Referring to the drawing in detail, wherein like numerals indicate like elements, there is shown in FIGURE 1 a vehicle washer designated generally as 10.

Figure 2A:
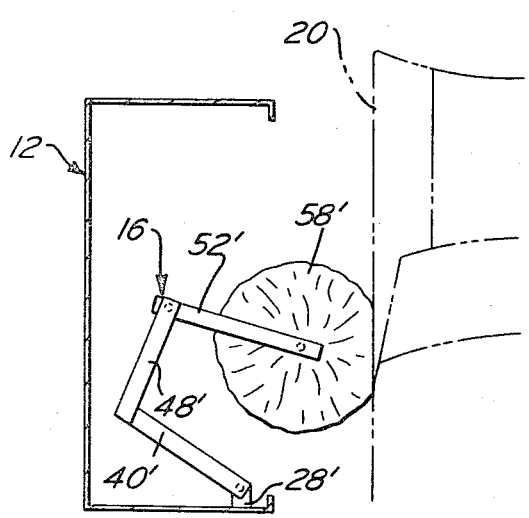
FIGURES 2A and 2B are diagrammatic illustrations of subsequent orientations for washing a vehicle side by the brushing unit.
Figure 2B:
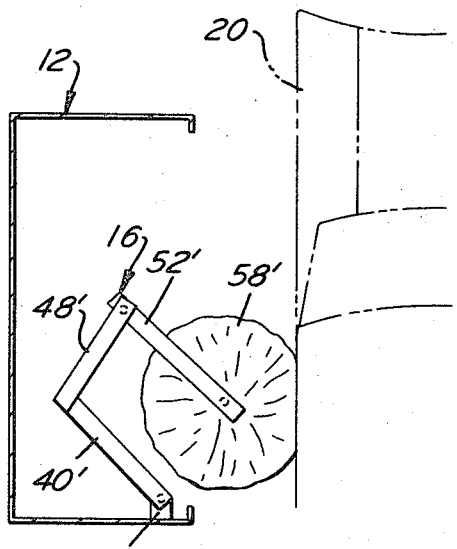

The vehicle washer 10 includes housings designated generally as 12 and 14 on opposite sides of a space through which the vehicle to be washed will be moved by a conveyor system diagrammatically illustrated at 13. Housings 12 and 14 are staggered along system 13 as illustrated in FIGURE 2. Each of the housings 12 and 14 contain a wrap-around brushing unit designated generally as 16 and 18 respectively.

The vehicle to be washed is designated as 20. Vehicle 20 has a front end 22 and a rear end 24. The vehicle 20 is provided with a top 26. Any conventional conveyor system 13 may be utilized to move the vehicle 20 to the position wherein it is moved past the open side walls of the housings 12 and 14. Each of the brushing units 16 and 18 are identical, but are of opposite hand. Accordingly, only brushing unit 18 will be described in detail with corresponding primed numerals being provided for the unit 16.

Within housing 14, there is provided an upper bracket 28 and a lower bracket 30. See FIGURE 4. A vertically disposed shaft 32 is rotatably supported by the brackets 28 and 30. A cam 34 is provided on the upper end of shaft 32 above bracket 28. A valve 38 is supported by the housing 14. Valve 38 is provided with an actuator terminating in a cam follower 36.

An upper arm member 40 and a lower arm member 42 have one end connected to the shaft 32 for rotation therewith. The other ends of the members 40 and 42 are rigidly connected to an upright strut 44. One end of an arm member 48 is connected to the other end of arm member 40. One end of arm member 46 is connected to the other end of arm member 42. The described interconnection between the arm members is a rigid construction. The included angle between arm members 40 and 48 corresponds to that between arm members 42 and 46, the same being slightly more than 90°.

Figure 1:
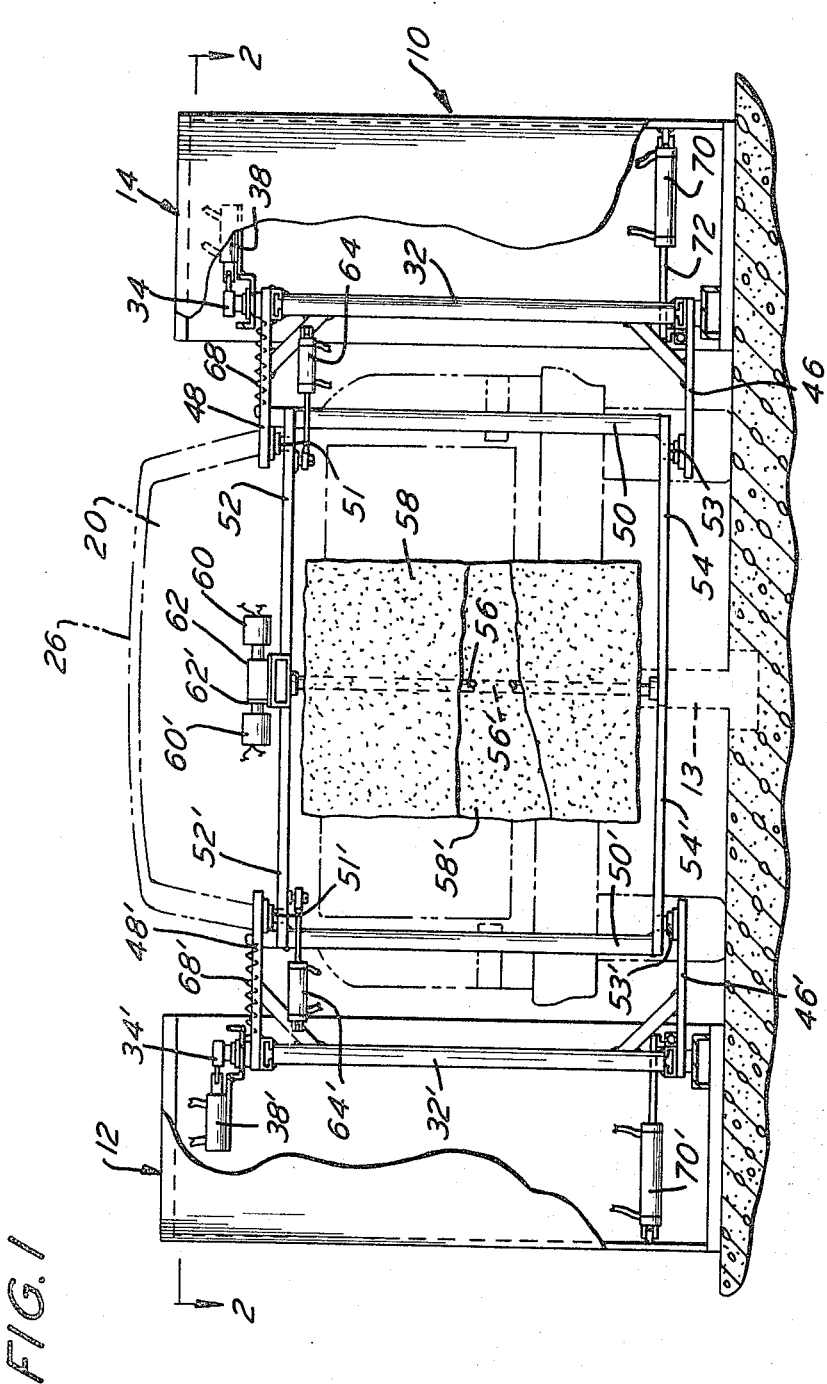
FIGURE 1 is an elevation view of the vehicle washer of the present invention.
Figure 4:
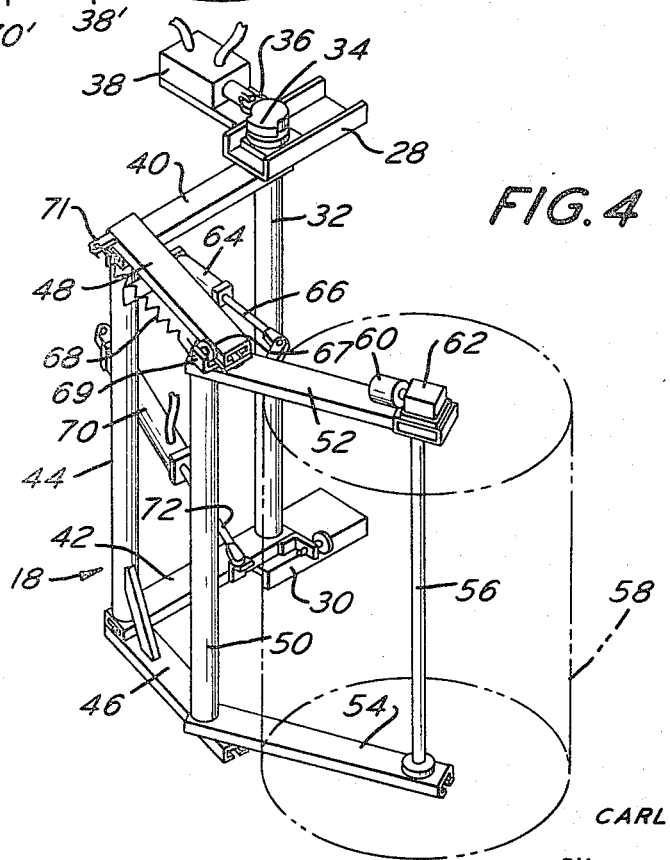
FIGURE 4 is a perspective view of a brushing unit.

One end of an arm member 52 is rigidly connected to the upper end of a strut 50 for rotation therewith. Members 52 and 54 pivot relative to members 46 and 48 about the axis of pins 51 and 53. See FIGURE 1. The other ends of arm members 52 and 54 rotatably support a vertical brush shaft 56. A brush 58 is secured to the shaft 56. In FIGURE 4, the brush 58 is shown in phantom so as not to obscure the elements associated therewith.

A motor 60 is supported by the arm member 52. The output from motor 60 is connected to shaft 56 through a gear box 62. Gear box 62 is also supported by arm member 52. Strut 50, arm members 52 and 54, and the elements supported thereby are selectively caused to pivot about the longitudinal axis of pins 52 and 53 by means of a cylinder 64 and piston rod 66. Cylinder 64 has one end pivotably supported by arm member 48. One end of piston rod 66 is connected to a piston within cylinder 64. The other end of piston rod 66 is pivotably connected to arm member 52. The introduction of a motive fluid to cylinder 64 is controlled by valve 38.

The brushing unit 18 is adapted to pivot about the longitudinal axis of shaft 32. This is selectively effected by means of cylinder 70 and piston rod 72. One end of cylinder 70 is pivotably supported by the housing 14. One end of piston rod 72 is connected to a piston within cylinder 70. The other end of piston rod 72 is pivotably connected to the arm member 42.

In the fully extended position of the brushing unit 18, the arm members 48 and 52 have an included angle of approximately 150°. To insure a proper orientation between arm members 48 and 52, a limit stop is provided. The limit stop may assume a wide variety of configurations. As illustrated, the limit stop includes an ear 69 on arm member 52 supporting a spring biased bumper 67 which is adapted to contact a side face of the arm member 48. Spring 68 biases the arm member 52 to the position illustrated in FIGURES 1 and 4. One end of spring 68 is connected to ear 69. The other end of spring 68 is connected to a lug 71 on the arm member 48.

Figure 6:
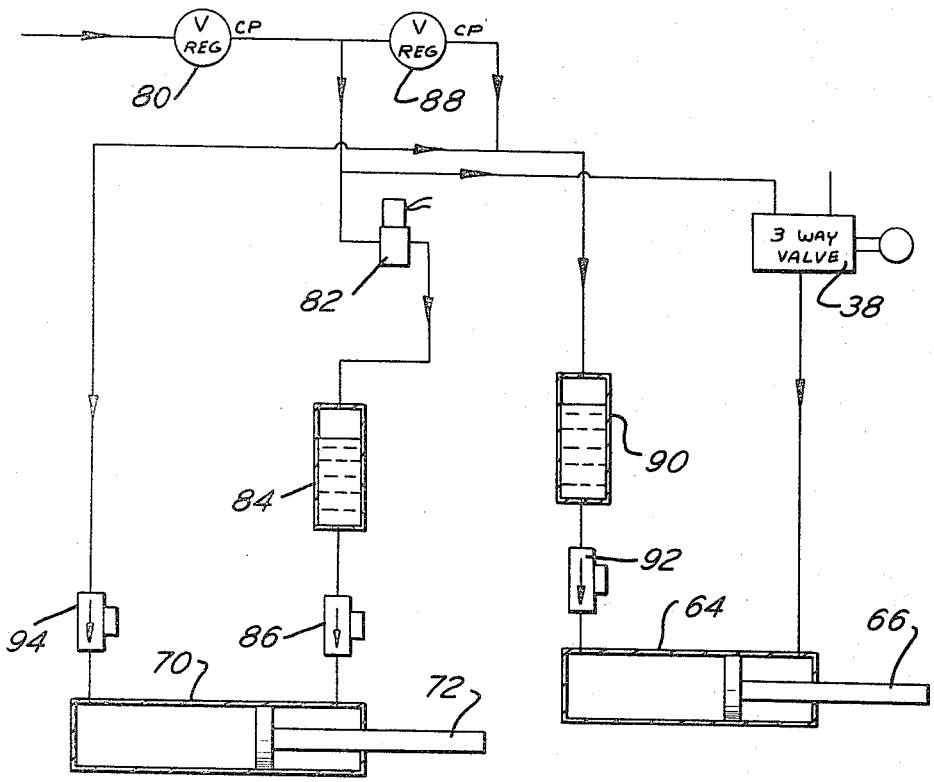
FIGURE 6 is a hydraulic circuit diagram.

The operation of brushing units 16 and 18 to effect a washing of the front, sides and rear of vehicle 20 traveling at a rate of about one foot per second is as follows. The circuit of FIGURE 6 is considered best described in connection with the description of operation.

Before vehicle 20 is caused to move to the space between the housings 12 and 14 by means of the conveyor 13, the brushing units 16 and 18 are in their solid-line positions illustrated in FIGURE 2. A washing liquid is sprayed on the car 20 by sprayer nozzles not shown. The brushes 58 and 58' are being rotated about the axis of their respective shafts 56 and 56'. The brushes overlap but do not interfere with each other due to the fact that they are staggered as shown more clearly in FIGURE 2. As the vehicle 20 moves to position A alongside housing 12, the brushing unit 16 engages the front end of the vehicle and is moved by the vehicle at station B to its phantom position illustrated in FIGURE 2. The same sequence occurs at stations C and D with respect to unit 18.

It is to be noted that at this point the cylinder 64 and piston rod 66 maintain the pivotable sections of unit 18 as a rigid structure. That is, arm member 52 is prevented from pivoting about the longitudinal axis of pins 51 and 53. The same is true of brushing unit 16. The brushing units 16 and 18 assume their phantom positions in FIGURE 2 sequentially since the units are staggered along the conveyor system 13. The shaft 32 will have rotated to a sufficient distance so that the cam 34 will actuate the valve 38 by way of the cam follower 34 associated therewith. As soon as the valve 38 is actuated, motive fluid is introduced into the cylinder 64 to effect a knuckling in of the brush 58. By knuckling in is meant that brush 58 and its supporting arm members 52 and 54 are caused to pivot about the longitudinal axis of pins 51 and 53 so as to decrease the included angle between arm members 48 and 52 to approximately 70–80°. The flow control valve for cylinder 64 is adjusted to a position so that as brush 58 travels along the side of vehicle 20 it gradually attains its knuckled-in position. See FIGURE 2B.

Figure 3:
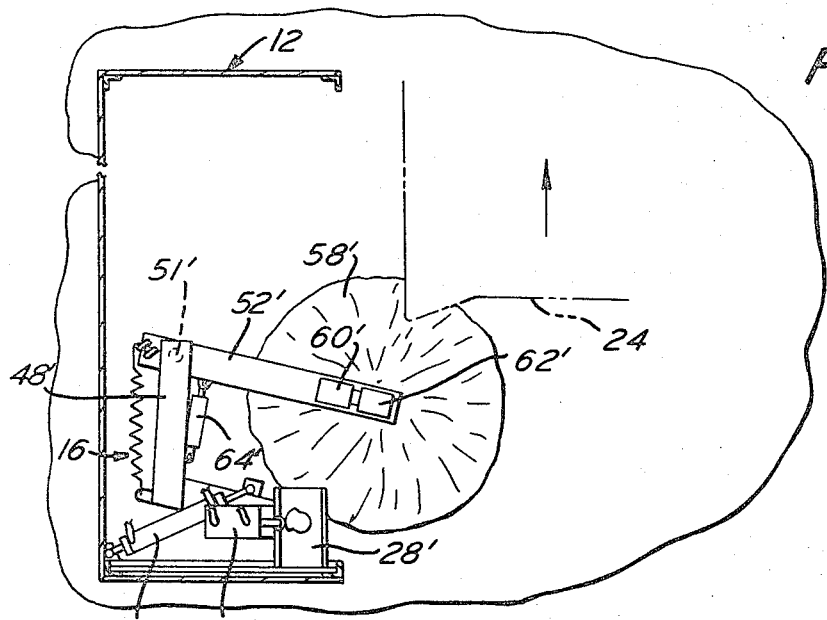
FIGURE 3 is a plan view of one brushing unit illustrating the position thereof with engagement with a rear corner of a vehicle.
Figure 3A:
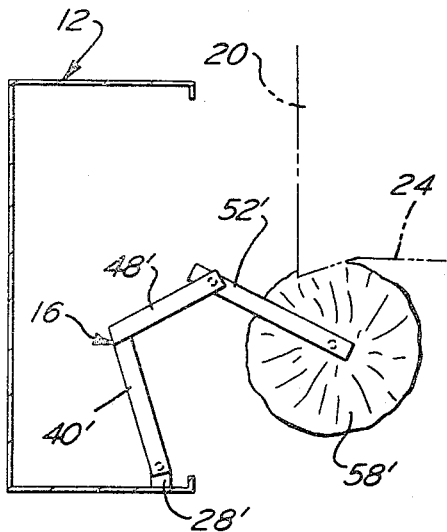
FIGURES 3A and 3B are diagrammatic illustrations of subsequent orientation for washing the rear of a vehicle by the brushing unit.
Figure 3B:
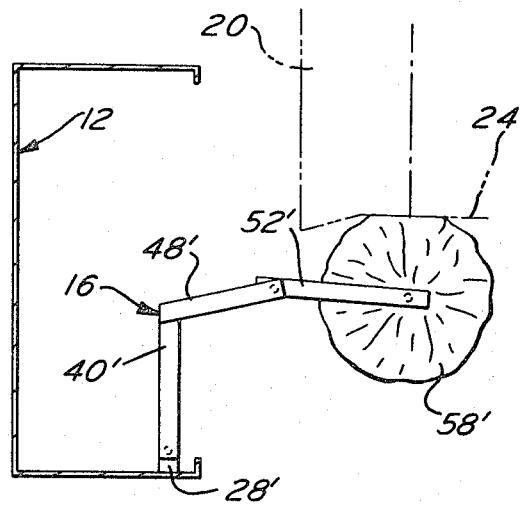

The knuckled-in position of brushing unit 16 is illustrated in FIGURES 3 and 3B. In the knuckled-in position of the brushes 58 and 58', they are biased to a position so that they are in intimate engagement with the sides of the vehicle and deformed to an extent of about 10–20% as shown. The brushes 58 and 58' continue to rotate due to the driving coupling to their respective motors 60 and 60'.

FIGURE 6 illustrates a hydraulic circuit diagram for one of the brushing units, namely unit 18. The circuits for the other brushing units 16 and 74 are identical. Filtered air is supplied to a high pressure regulator 80 which is self-bleeding so that the outlet side is controlled to a desired pressure such as 40 p.s.i.g. From regulator 80 the air is directed to a normally closed three-way solenoid valve 82, to an oil reservoir 84, to adjustable flow control valve 86, and then to cylinder 70. Also, the high pressure air is diverted through valve 38 to cylinder 64.

From regulator 80, the high pressure air may pass through low pressure regulator 88 which reduces the pressure to about 10 p.s.i.g. From regulator 88, air may flow to oil regulator 90 to cause the oil therein to flow through adjustable flow control valve 92 to cylinder 64. Also, some of the low pressure air from regulator 88 flows through adjustable control valve 94 to cylinder 70.

As the pressure to the left of the piston in cylinder 10 (FIGURE 6) or above the oil in reservoir 90 increases above 10 p.s.i.g., it bleeds out through a vent in regulator 88. The space above the oil in reservoir 84 is normally vented to atmosphere by valve 82. These pressures are for purpose of illustration and may be increased or decreased if desired. The control valves permit rapid flow in the direction of the arrow superimposed thereon in FIGURE 6, but control flow at a restricted rate in the opposite direction. Thus, valve 92 may be adjusted so that the knuckled-in position of brush 58 is attained at the desired location with respect to the length of the vehicle. It is generally not preferable to move the brushes to a knuckled-in position immediately.

Cylinder 70 is controlled by air pressure constantly supplied through self-bleeding regulator 88 to one end of the cylinder 70 to effect a movement of the brush 58 to the position illustrated in FIGURE 2. The motive fluid for all of the cylinders described above preferably includes a hydraulic oil so as to prevent bouncing of the units during actuation. When the brushes 58 and 58' are moved to the phantom position illustrated in FIGURE 2, the maintained air in cylinders 70 and 70' is compressed so that the cylinders act as a spring. As soon as the brushes 58 and 58' clear the sides of the vehicle 20, the entire brushing unit is moved by its respective cylinders in a direction toward the conveyor system 13.

As the brushes 58 and 58' move toward system 13, the shafts 32 and 32' rotate. As a result thereof, the motive fluid supplied to the cylinders 64 and 64' is relieved and they are vented to atmosphere by valve 38. Thereafter, the springs 68 and 68' contract to thereby move the brushes 58 and 58' to their completely extended positions. See FIGURE 3B. As the brushes 58 and 58' move to their extended positions from a knuckled-in position under the dual influence of their cylinders and springs, they wash the rear end 24 of the vehicle 20. In doing so, the brushes move toward system 13 at an angle with respect thereto so that the brushes can maintain contact with rear end 24. See FIGURES 3, 3A and 3B.

Thereafter, the brushes 58 and 58' are individually in a position to be contacted by the front end of the next vehicle and cause the above process to be repeated. Since the brushes are in position ready to contact the front end of a new vehicle as soon as the rear end is washed, the distance between adjacent vehicles may be as small as three feet. It will be understood that while brush 58 is washing one-half of rear end 24 of vehicle 20, brush 58' is still washing a side of vehicle 20. When brush 58' is washing the remainder of rear end 24, brush 58 has already made contact with the front end of the next vehicle.

Figure 5:
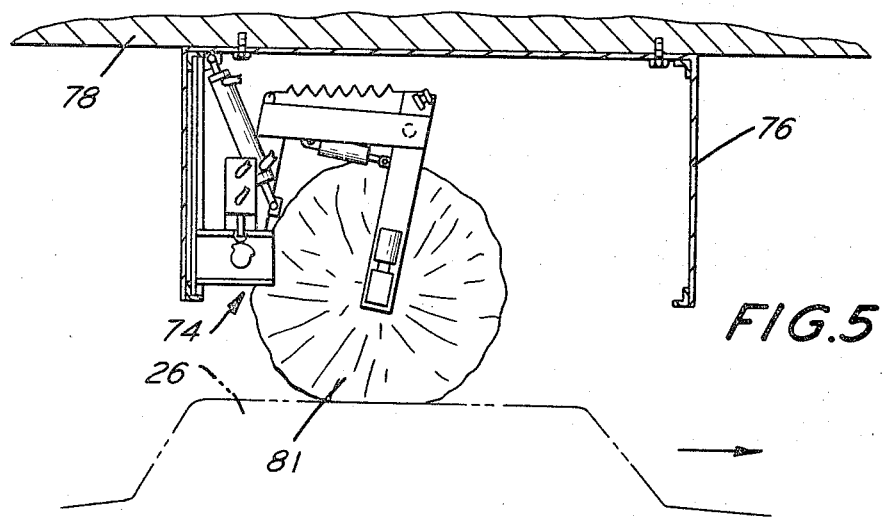
FIGURE 5 is a sectional view showing the manner in which the brushing unit is utilized in washing the top of a vehicle.

There is shown in FIGURE 5 a top brushing unit designated generally as 74. Unit 74 is supported by a housing 76 which in turn may be supported by any convenient surface such as a ceiling 78. Unit 74 is identical with units 16 and 18 and therefore need not be described in detail. The brush 81 of unit 74 contacts the top of the vehicle 20 and washes the same. Unit 74 can be positioned at any convenient location along conveyor system 13.

As used hereinafter, the housing 12, 14 and 76 may be referred to as a support structure. The brushing units may be referred to hereinafter as having two sections pivoted together. Thus, one section would be arm members 54 and 52 and the elements supported thereby which pivot about the longitudinal axis of shaft 50 with respect to the remaining elements constituting the other section. It will be apparent that the motor 60 is capable of rotating the brush 58 in the extended and collapsed positions of the sections.

Hereinafter, spring 68 may be referred to as a means coupled between the sections for biasing one section to its extended position as illustrated in FIGURE 4, for example. Hereinafter, the cylinder 64 and its position rod 66 may be referred to as an actuator means or as a means connected to the sections for opposing the bias of spring 68 and for pivoting said one section relative to the other section. Hereinafter, the cylinder 70 may be referred to as a means for moving both sections and the brush 58 as a unit between an extended position as shown in phantom in FIGURE 2 all relative to the support structure for the unit.

The present invention may be embodied in other specific forms without departing from the spirit or essential attributes thereof and, accordingly, reference should be made to the appended claims, rather than to the foregoing specification as indicating the scope of the invention.

I claim:

1. In a vehicle washer comprising a brushing unit mounted for pivotably movement between a retracted position and an extended position, said unit having two sections pivoted together, support structure for said unit, a brush rotatably supported by one section, means connected to said brush to rotate said brush in collapsed and extended positions of said sections, limit stop means to limit the maximum pivotable extent of said one section with respect to the other section, means connected to said sections for selectively opposing pivoting of said one section relative to the other section, spring means coupled between said sections for biasing said one section to its extended position, and means connected to said unit for moving said entire unit between its retracted and extended positions relative to said support structure.

2. In a vehicle washer comprising a brushing unit mounted for pivotable movement between a retracted position wherein it may engage the side of a vehicle and an extended position wherein it may engage the front or rear of a vehicle, said unit having two sections pivoted together, support structure for said unit, a brush rotatably supported by one section, means connected to said brush to rotate said brush in collapsed and extended positions of said sections, limit stop means carried by said sections to limit the maximum pivotable extent of said one section with respect to the other section, means coupled between said sections for biasing said one section to its extended position, actuator means connected to said one section for selectively opposing said biasing means and for selectively pivoting said one section relative to the other section, and means connected to said unit for moving said entire unit between its retracted and extended positions relative to said support structure.

3. In a washer in accordance with claim 2 wherein said means connected to said sections for opposing pivoting of said one section relative to the other includes cylinder and piston rod, one end of said cylinder being pivotably connected to one of said sections, and one of said piston rod being pivotably connected to the other of said sections.

4. In a vehicle washer comprising a brushing unit mounted for pivotable movement between a retracted position and an extended position, said unit having two sections pivoted together, support structure for said unit, a brush rotatably supported by one section, means connected to said brush to rotate said brush in collapsed and extended positions of said sections, limit stop means to limit the maximum pivotable extent of one section with respect to the other section, actuator means connected to said sections for selectively opposing pivoting of said one section relative to the other section, means connected to said unit for moving said entire unit between its retracted and extended positions relative to said support structure, said unit being pivotably mounted for movement about the longitudinal axis of a shaft, a valve for controlling flow of motive fluid to said actuator means, and said valve having an actuator responsive to the rotary position of said shaft.

5. In a washer in accordance with claim 4 wherein said sections are connected together for pivotal movement about an axis parallel to the longitudinal axes of said shaft.

6. In a washer in accordance with claim 1 wherein said sections are connected together for pivotable movement with respect to each other about a vertical axis, and said unit being mounted for pivotable movement about a vertical axis.

7. In a washer in accordance with claim 2 wherein said unit is mounted for pivotable movement about a vertical shaft, a cam connected to said shaft, a control valve for said actuator means, a cam follower for said cam, said cam follower being connected to an actuator for said valve.

8. In a washer in accordance with claim 2 wherein said other section is rigid and generally L-shaped, said one section being pivotably connected to one end of said other section, the included angle between the adjacent ends of said sections being less than about 180 degrees and greater than 140 degrees when the sections are in their extended positions, the included angle between adjacent ends of said sections being approximately 70–80 degrees when said one section is in its collapsed position.

9. In a washer in accordance with claim 2 including a second unit identical with said first-mentioned unit, said units being of opposite hand and spaced from each other so that a vehicle to be washed may pass therebetween, said units being staggered with respect to each other.

10. In a washer in accordance with claim 2 wherein said limit stop means is a spring-biased bumper.

References Cited by the Examiner

UNITED STATES PATENTS

| | | | |
|---|---|---|---|
| 1,654,664 | 1/1928 | Parker | 15—53 |
| 3,237,348 | 3/1966 | Block. | |
| 3,241,167 | 3/1966 | Murillo et al. | |

FOREIGN PATENTS

| | | |
|---|---|---|
| 1,196,147 | 5/1959 | France. |
| 524,489 | 5/1931 | Germany. |
| 892,598 | 3/1962 | Great Britain. |

CHARLES A. WILLMUTH, *Primary Examiner.*

E. L. ROBERTS, *Assistant Examiner.*